(12) United States Patent
Mariappan et al.

(10) Patent No.: US 11,444,836 B1
(45) Date of Patent: Sep. 13, 2022

(54) MULTIPLE CLUSTERS MANAGED BY SOFTWARE-DEFINED NETWORK (SDN) CONTROLLER

(71) Applicant: Juniper Networks, Inc., Sunnyvale, CA (US)

(72) Inventors: Yuvaraja Mariappan, San Jose, CA (US); Sachchidanand Vaidya, Santa Clara, CA (US); James Nicholas Davey, San Jose, CA (US); Margarida Correia, Suffolk (GB)

(73) Assignee: Juniper Networks, Inc., Sunnyvale, CA (US)

( * ) Notice: Subject to any disclaimer, the term of this patent is extended or adjusted under 35 U.S.C. 154(b) by 135 days.

(21) Appl. No.: 16/912,596

(22) Filed: Jun. 25, 2020

(51) Int. Cl.
| | |
|---|---|
| *H04L 41/0893* | (2022.01) |
| *H04L 45/586* | (2022.01) |
| *H04L 41/084* | (2022.01) |
| *G06F 9/455* | (2018.01) |
| *H04L 67/10* | (2022.01) |

(52) U.S. Cl.
CPC ...... *H04L 41/0893* (2013.01); *G06F 9/45558* (2013.01); *H04L 41/0843* (2013.01); *H04L 45/586* (2013.01); *H04L 67/10* (2013.01); *G06F 2009/4557* (2013.01); *G06F 2009/45595* (2013.01)

(58) Field of Classification Search
CPC ............. H04L 41/0893; H04L 41/0843; H04L 45/586; H04L 67/10; G06F 9/45558; G06F 2009/4557; G06F 2009/45595
See application file for complete search history.

(56) References Cited

U.S. PATENT DOCUMENTS

| | | | |
|---|---|---|---|
| 6,397,260 B1* | 5/2002 | Wils | H04L 45/00 709/200 |
| 8,755,377 B2 | 6/2014 | Nakil et al. | |
| 9,571,394 B1 | 2/2017 | Sivaramakrishnan et al. | |
| 9,641,435 B1* | 5/2017 | Sivaramakrishnan | H04L 49/70 |
| 10,200,274 B1 | 2/2019 | Suryanarayana et al. | |
| 10,567,288 B1 | 2/2020 | Mutnuru | |
| 2003/0093187 A1* | 5/2003 | Walker | B64D 45/0059 701/1 |

(Continued)

FOREIGN PATENT DOCUMENTS

WO 2013184846 A1 12/2013

*Primary Examiner* — Ninos Donabed
(74) *Attorney, Agent, or Firm* — Shumaker & Sieffert, P.A.

(57) ABSTRACT

In general, the disclosure describes examples where a single software-defined network (SDN) controller is configured to receive an indication of a first cluster identifier for a first cluster of computing devices and receive an indication of a second cluster identifier for a second cluster of computing devices. In response to a determination that first configuration information indicates the first cluster identifier, the SDN controller is configured to configure a first set of virtual routers at the first cluster to connect the first group of workloads to a network using the first configuration information. In response to a determination that second configuration information indicates the second cluster identifier, the SDN controller is configured to configure a second set of virtual routers at the second cluster to connect the second group of workloads to a network using the second configuration information.

17 Claims, 5 Drawing Sheets

(56) References Cited

U.S. PATENT DOCUMENTS

| | | | |
|---|---|---|---|
| 2012/0017042 A1* | 1/2012 | Matsui | G06F 3/0608 711/E12.016 |
| 2015/0180769 A1* | 6/2015 | Wang | H04L 45/38 370/236 |
| 2015/0281054 A1* | 10/2015 | Utgikar | H04L 45/586 709/221 |
| 2016/0087872 A1* | 3/2016 | Park | H04L 41/20 709/223 |
| 2016/0191545 A1* | 6/2016 | Nanda | H04L 43/062 726/1 |
| 2016/0224241 A1* | 8/2016 | Verrilli | G06F 3/0659 |
| 2016/0337236 A1* | 11/2016 | Hsu | H04L 29/12028 |
| 2017/0031704 A1* | 2/2017 | Sudhakaran | G06F 16/128 |
| 2017/0149843 A1* | 5/2017 | Amulothu | H04L 63/083 |
| 2019/0036868 A1* | 1/2019 | Chandrashekhar | H04L 45/021 |
| 2019/0087220 A1* | 3/2019 | Turner | G06F 21/10 |
| 2019/0109457 A1* | 4/2019 | Flatau | G05B 13/0265 |
| 2019/0149463 A1* | 5/2019 | Bajaj | H04L 47/125 370/401 |
| 2019/0149464 A1* | 5/2019 | Bajaj | H04L 41/0806 370/401 |
| 2019/0166003 A1* | 5/2019 | Shelke | H04L 41/20 |

\* cited by examiner

MULTIPLE CLUSTERS MANAGED BY SOFTWARE-DEFINED NETWORK (SDN) CONTROLLER

TECHNICAL FIELD

The disclosure relates to computer networking, and more particularly, computer networking in a multi-cloud environment.

BACKGROUND

In a typical cloud data center environment, which may be referred to herein as simply a "cloud," there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtual machines are a virtualization scheme based on machine-level virtualization. Virtual machines include a guest operating system that runs on a hypervisor of the host computing device to emulate the hardware of a computer to provide a new computer environment for executing applications.

Containerization is a virtualization scheme based on operation system-level virtualization. Containers are lightweight and portable execution environments for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can support many more container instances than traditional virtual machines (VMs). Often short-lived, containers can be created and moved more efficiently than VMs, and they can also be managed as groups of logically-related elements referred to herein as "workloads" (sometimes referred to as "pods" for some orchestration platforms, e.g., Kubernetes). These container characteristics impact the requirements for container networking solutions: the network should be agile and scalable. VMs, containers, and bare metal servers may need to coexist in the same cloud environment, with communication enabled among the diverse deployments of applications. The container network should also be agnostic to work with the multiple types of orchestration platforms that are used to deploy containerized applications.

SUMMARY

In general, the disclosure describes examples where a single software-defined network (SDN) controller manages deployment, isolation, multi-tenancy, and/or infrastructure for a plurality of clusters. One or more clouds may provide computing services and/or storage services that are consumed by the plurality of clusters. A cluster may represent one or more devices (e.g., virtual devices or physical devices) that consume computing services and/or storage services. In contrast, a cloud may represent a provider of the computing services and/or storage services.

In some techniques, an administrator may manage computing services and/or storage services by a single cluster. For example, a third party may use a first SDN controller comprising a first group of workloads for a single cluster associated with a particular application generated using the application template from an application developer. As used herein, workloads may provide any of a number of different types of services for managing an overlay and/or underlay network of a cluster. In this example, the application developer may access the first SDN controller to manage deployment and infrastructure for the particular application.

In some instances, more than one entity (a third party, a business, a group of people, a government entity, or another entity) may use the application template. For example, the application developer may access a second SDN controller to manage deployment and infrastructure for a second application generated by a second third party using the application template. In this way, the application developer may manage deployment and infrastructure for application execution at the plurality of clusters.

However, establishing a SDN controller for each cluster associated with an application template may increase an amount of time to manage deployment. For example, the administrator for the application template may access the first SDN controller to manage deployment and infrastructure for the first application and then access the second SDN controller to manage deployment and infrastructure for the second application. Moreover, establishing a SDN controller for each cluster associated with an application template may be resource intensive as each SDN controller. For example, each SDN controller may reserve or consume resources for each cluster.

In accordance with the techniques of the disclosure, a SDN controller may be configured to manage deployment and infrastructure for a plurality of clusters. For example, a single SDN controller may manage deployment and infrastructure for both a first application implemented in a first cluster and a second application implemented in a second cluster. The single SDN controller may control a first group of workloads for the first cluster and a second group of workloads for the second cluster. The SDN controller may manage, ensure, and/or provide isolation and other multi-tenancy infrastructure, and may provide networking infrastructure generally for each cluster When performing a configuration change, the SDN controller may determine an indication of a group of workloads (e.g., one or more workloads) and perform a configuration operation only on the appropriate workloads. For example, an administrator of a first cluster may request to configure a first group of workloads within the first cluster using a first cluster identifier for the first cluster. In this example, the single SDN controller may perform the configuration operation only on a first group of workloads in response to determining that the request indicates the first cluster identifier. Similarly, an administrator of a second cluster may request to configure a second group of workloads within the second cluster using a second cluster identifier for the second cluster. The single SDN controller may perform the configuration operation only on the second group of workloads in response to determining that the request indicates the second cluster identifier. In this way, the single SDN controller may be configured to independently manage deployment and infrastructure for the first cluster and the second cluster. While this example refers to a software application case, in other examples, multiple clusters may be associated differently. For example, a group of clusters may each be implemented at a respective edge router for a network and an administrator for the network may manage the group of clusters.

Techniques of this disclosure may provide one or more technical advantages. For example, the techniques may potentially provide for centralized management of multiple clusters, which may allow one administrator to ensure proper application deployment on the plurality of clusters using a common interface. The common SDN controller for proper application deployment among the plurality of clusters may enable seamless managing among multiple clusters with isolation between each cluster. The SDN controller may also enable management, by some properly authenticated administrators, across the multiple clusters; such clusters may appear to the operator or developer as a single cluster while separately tracking a consumption of computing services and/or storage services by each of the plurality of clusters. For example, the common SDN controller may be configured to enable each cluster administrator to manage his or her own cluster, without affecting the management of other clusters managed. While the above example described an application template, multiple clusters may be used to support other cases. For example, a SDN controller may manage a plurality of edge routers, where each cluster is implemented within a respective single edge router.

In one example, the disclosure describes a system comprising a single software-defined networking (SDN) controller, executing on processing circuitry, configured to: receive an indication of a first cluster identifier for a first cluster of computing devices, wherein the first cluster is implemented using a first orchestrator controller of a container orchestration system, the first orchestrator controller configured to establish a first group of workloads for the first cluster; receive an indication of a second cluster identifier for a second cluster of computing devices, wherein the second cluster is implemented using a second orchestrator controller of the container orchestration system that is different from the first orchestrator controller, the second orchestrator controller configured to establish a second group of workloads for the second cluster; in response to a determination that first configuration information indicates the first cluster identifier, configure a first set of virtual routers at the first cluster to connect the first group of workloads to a network using the first configuration information; and in response to a determination that second configuration information indicates the second cluster identifier, configure a second set of virtual routers at the second cluster to connect the second group of workloads to a network using the second configuration information.

In one example, the disclosure describes a method comprising receiving an indication of a first cluster identifier for a first cluster of computing devices, wherein the first cluster is implemented using a first orchestrator controller of a container orchestration system, the first orchestrator controller configured to establish a first group of workloads for the first cluster; receiving an indication of a second cluster identifier for a second cluster of computing devices, wherein the second cluster is implemented using a second orchestrator controller of the container orchestration system that is different from the first orchestrator controller, the second orchestrator controller configured to establish a second group of workloads for the second cluster; in response to determining that first configuration information indicates the first cluster identifier, configuring a first set of virtual routers at the first cluster to connect the first group of workloads to a network using the first configuration information; and in response to determining that second configuration information indicates the second cluster identifier, configuring a second set of virtual routers at the second cluster to connect the second group of workloads to a network using the second configuration information.

In one example, the disclosure describes a computer-readable storage medium storing instructions thereon that when executed cause one or more processors, via execution of a single SDN controller, to receive an indication of a first cluster identifier for a first cluster of computing devices, wherein the first cluster is implemented using a first orchestrator controller of a container orchestration system, the first orchestrator controller configured to establish a first group of workloads for the first cluster; receive an indication of a second cluster identifier for a second cluster of computing devices, wherein the second cluster is implemented using a second orchestrator controller of the container orchestration system that is different from the first orchestrator controller, the second orchestrator controller configured to establish a second group of workloads for the second cluster; in response to a determination that first configuration information indicates the first cluster identifier, configure a first set of virtual routers at the first cluster to connect the first group of workloads to a network using the first configuration information; and in response to a determination that second configuration information indicates the second cluster identifier, configure a second set of virtual routers at the second cluster to connect the second group of workloads to a network using the second configuration information.

The details of one or more examples are set forth in the accompanying drawings and the description below. Other features, objects, and advantages will be apparent from the description and drawings, and from the claims.

DETAILED DESCRIPTION

A cloud computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable communication among applications running on virtual execution environments, such as containers or VMs, as well as among applications running on legacy (e.g., physical) environments. Software-defined networking contributes to network management.

A cloud environment may include a single cloud for providing computing and storage services. In some examples, a cloud environment may include multiple clouds for providing computing and storage services. For example, an enterprise may utilize an on-premise computing and/or storage service (e.g., on-premises cloud), and one or more off-premise clouds such as those hosted by third-party providers. Examples of the clouds include private, public, or hybrid public/private clouds that allow for ease of scalability while allowing different levels of control and security. An enterprise may utilize one or more of private, public, or hybrid public/private clouds based on the types of applications that are executed and other needs of the enterprise. The cloud computing infrastructure may manage a cluster representing a consumption of the computing and storage services provided by one or more clouds of the cloud environment.

Figure 1A:
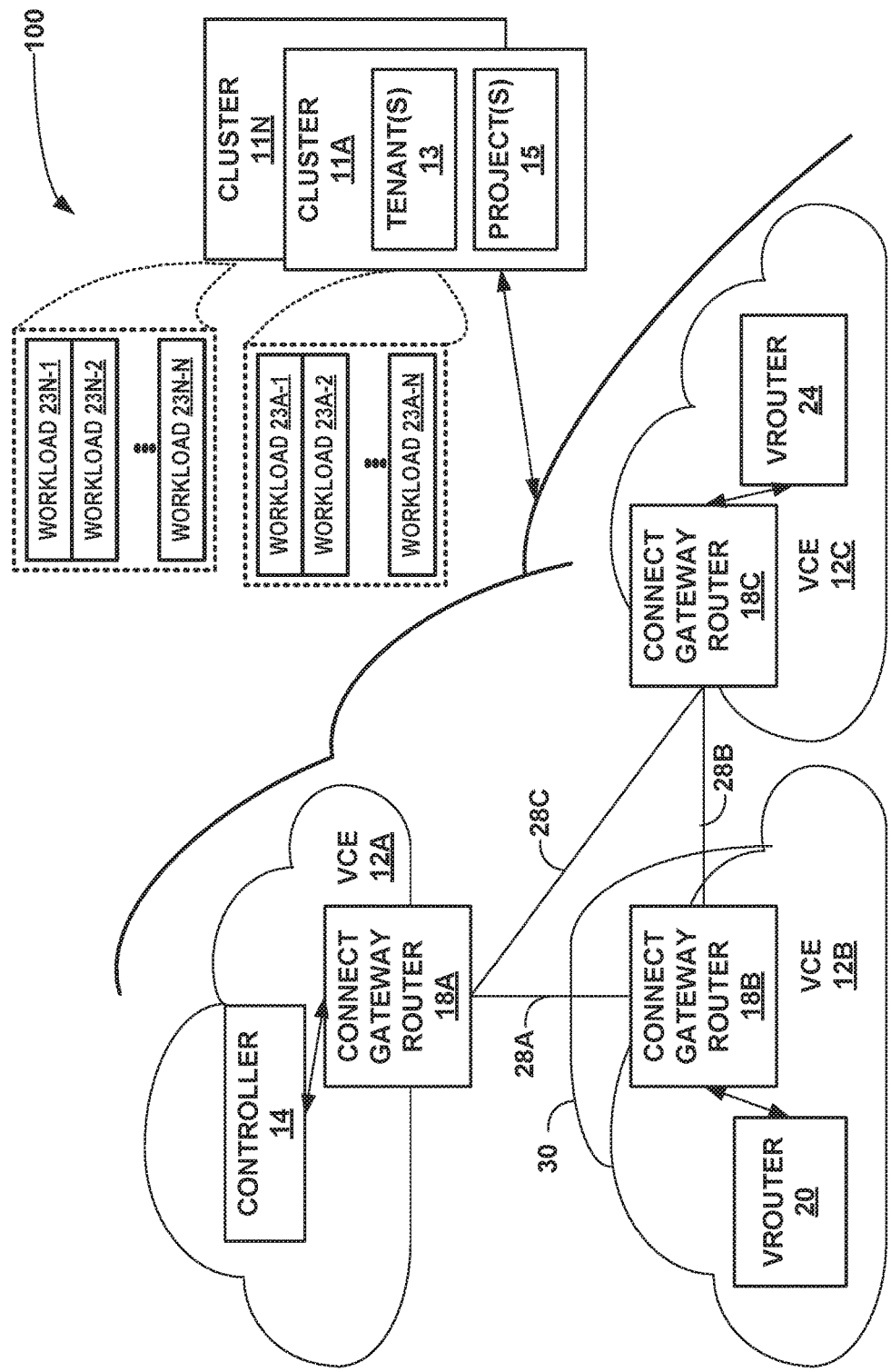
FIG. 1A is a block diagram illustrating an example multi-cluster network configured to communicate in accordance with one or more example techniques described in this disclosure.

FIG. 1A is a block diagram illustrating an example multi-cluster network configured to communicate in accordance with one or more example techniques described in this disclosure. As illustrated, multi-cluster network 100 includes virtual computing environments (VCEs) 12A-12C (collectively VCEs 12) and clusters 11A-11N (collectively, clusters 11). While this example includes multiple VCEs, some examples may include only one VCE (i.e., one cloud). VCEs 12 may be provisioned within a public, private, hybrid, or other "cloud" that provides storage and compute for various applications. A cloud may refer to computing infrastructure that may be virtualized to support one or more virtual computing environments provisioned thereon or may also or alternatively refer to a virtual computing environment itself. For instance, VCEs 12 may be provisioned on a plurality of servers hosted on a network (e.g., Internet) to store, manage, and process data, rather than on a personal computer. In some examples, one or more of VCEs 12 may be on-premises of an enterprise, and the other VCEs 12 are remote. In some examples, all of VCEs 12 may be remote from the enterprise.

Controller 14 may configure aspects of clusters 11, and may be implemented through a computing device and/or processing circuitry, whether physical or virtual. Further example details of a controller 14 operating as a software defined network controller to configure overlay and/or underlay network elements within a computing domain are described in U.S. Pat. No. 8,755,377, filed Mar. 15, 2013, U.S. Pat. No. 10,200,274, filed Mar. 31, 2017, and U.S. patent application Ser. No. 15/823,906 filed Nov. 28, 2017, all of which are hereby incorporated by reference.

One or more of clusters 11 may be on-premises of an enterprise, where some or all of other clusters 11 are remote. In other examples, some or all of clusters 11 may be remote from the enterprise. Further, in some examples, clusters 11 may all be included within a single data center. In still other examples, each of clusters 11 may be deployed within a unique own data center, or possibly, one or more of clusters 11 may span multiple data centers or geographic regions.

Clusters 11 may be configured to consume computing services and/or storage services provided by VCEs 12. Each of clusters 11 may support one or more tenants 13, and may be referred to herein as simply "tenant 13" or "tenants 13." For example, tenant 13 may refer to a group of users who share a common project with specific privileges to a software application instance. Each one of clusters 11 may support one or more projects 15, and may be referred to herein as simply "project 15" or "projects 15." As illustrated in FIG. 1A, clusters 11 may share a common project and/or may have different projects in controller 14. For example, project 15 may refer to an isolated group of associated resources that can be used to segregate different users and/or tenants.

Clusters 11 (e.g., enterprise or individual) may use one or more VCEs 12 to off load storage or computation capabilities that can be handled faster or more efficiently on the servers of VCEs 12. For example, VCEs 12 may provide access to much more memory storage than would be available on a personal computer, or within a server located on-premises. VCEs 12 may also provide much more compute power, to handle complex tasks such as large data processing, than would be available on a personal computer, or within a server located on-premises. Moreover, VCEs 12 provide redundancy storage. Accordingly, clusters 11 may rely more and more on networks such as VCEs 12.

Clusters 11 may be each dedicated to an entity. Examples of entities may include, but are not limited to, a company, a user, a group of users, a public entity, a part of a company (e.g., a subsidiary), a vender, a third party vender, or another entity. For example, a customer (e.g., administrator of controller 14) may provide a dedicated cluster for each of his or her third party vendors, each cluster of which may provide network functions for the customer workloads. However, establishing a unique SDN controller for each one of clusters 11 may result in an administrator having to access multiple SDN controllers to monitor clusters 11, which may inefficient, cumbersome, and could potentially lead to delays in monitoring clusters 11.

Each one of clusters 11 may support one or more private networks. For example, computing devices assigned to a first project implemented by cluster 11A may have local IP addresses that are the same or different from IP addresses of a second project implemented by clusters 11. In some examples, a first orchestrator controller may generate resources for cluster 11A and a second orchestrator controller that is different from the first orchestrator controller may generate resources for cluster 11N.

Controller 14 may configure virtual routers of clusters 11 to support workloads 23A-1 through 23A-N (referred to herein as simply "workloads 23A") and workloads 23N-1 through 23N-N (referred to herein as simply "workloads 23N.") Workloads 23A and workloads 23N may be collectively referred to herein as simply "workloads 23" Each one of workloads 23 may include any number (e.g. N number) of workloads.

In each of clusters 11, workloads 23 may represent a different service offered or performed by controller 14. In some examples, each of workloads 23 may be configurable through an API (application programming interface) of an orchestration controller. For example, a first orchestration controller of cluster 11A may configure workloads 23A and a second orchestration controller of cluster 11N may configure workloads 23N. Workloads 23 may provide any of a number of different types of services for managing an overlay and/or underlay network of clusters 11, including authentication (e.g., OpenStack's Keystone service), image management (e.g., OpenStack's Glance service), storage (e.g., OpenStack's Swift service), analytics, telemetry, or other services, each provided using workloads 23. In some examples, each of workloads 23 within cluster 11A (or within clusters 11 generally) operates as a different service that can be configured, such as a different process, virtual machine, container, or the like, for implementing the functions of the SDN controller. Each of clusters 11 further may include a corresponding network and any number of servers for providing compute resources. In general, components within each of clusters 11 may communicate over one or more networks, which may be or include the internet or any public or private communications network or other network. Such networks may include one or more of networks within clusters 11.

Controller 14 may store a cluster identifier for each one of clusters 11. For example, Controller 14 may store a cluster identifier for cluster 11A within memory of controller 14. Similarly, controller 14 may store a second cluster identifier for cluster 11N within memory of controller 14.

To provide a dedicated cluster for each of his or her third party vendors, techniques described herein may manage multiple clusters using a single SDN controller (e.g., controller 14). In cases where a customer is an application developer, the customer may generate an application template. Each third party vendor may generate a unique software application using the application template and establish a respective cluster for the unique software application. Again, each of clusters 11 may include one or more tenants 13 and/or projects 15. For example, cluster 11A may comprise various tenants (e.g., users) and various projects (e.g., configured for different virtual networks) that are all for a particular third party vendor.

In edge compute use cases, a cluster (e.g., Kubernetes clusters) may be deployed in the edge clusters. For example, each one of clusters 11 may be deployed behind a respective edge router of a computing network. For instance, cluster 11A may be deployed only within a first edge router and cluster 11B may be deployed only within a second edge router different from the first edge router. Again, establishing a unique SDN controller for each one of clusters 11 may result in an administrator having to access multiple SDN controllers to monitor clusters 11, which may be cumbersome or potentially lead to delays in monitoring clusters 11. In accordance with the techniques of the disclosure, a single SDN controller (e.g., controller 14) may manage a network across multiple edge clusters. Managing a network across multiple edge clusters using a single SDN controller may potentially reduce processing effort of managing edge routers because fewer SDN controllers would need to support a plurality of edge routers.

Figure 2:
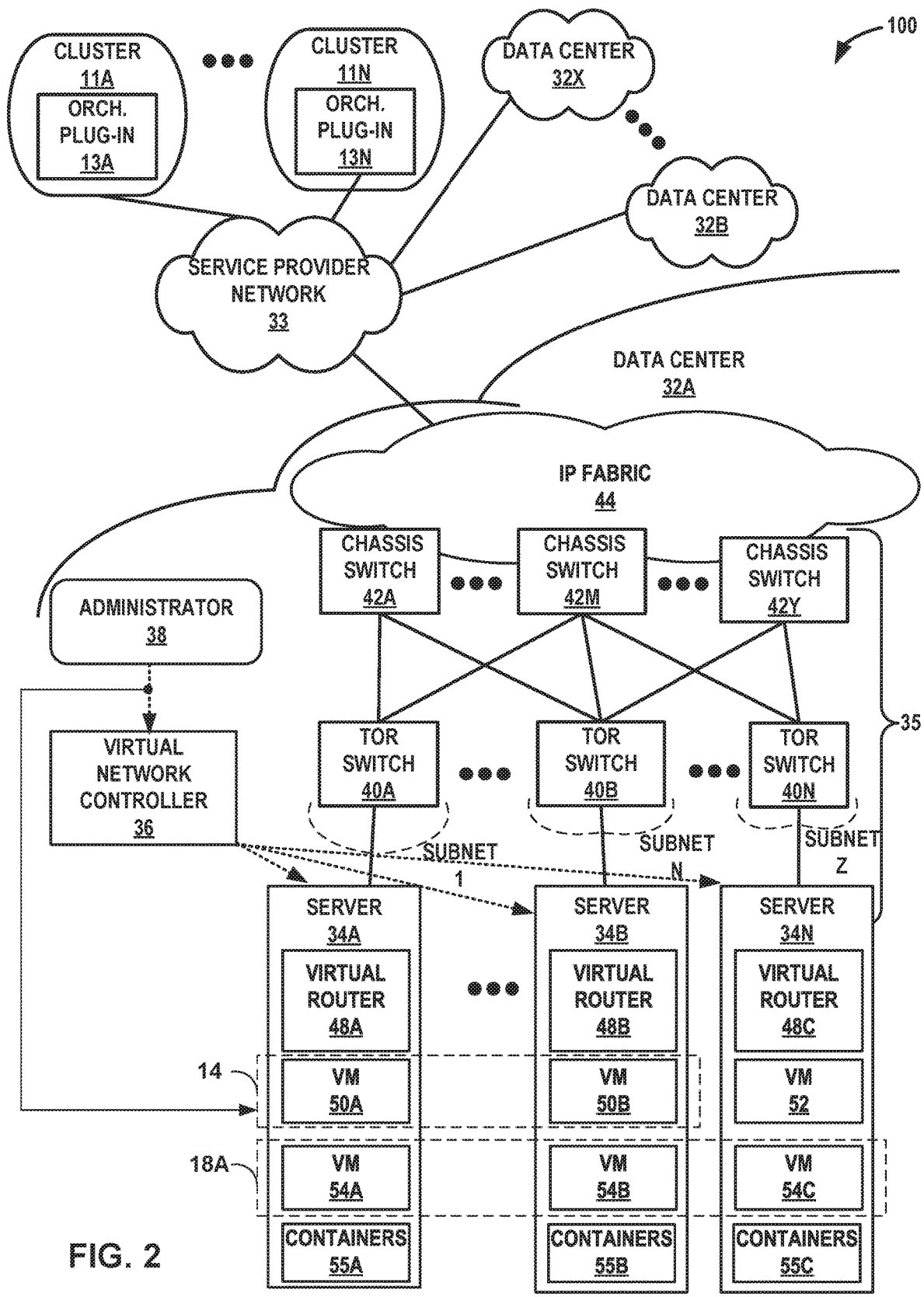
FIG. 2 is a block diagram illustrating an example multi-cluster network having a data center in which examples of the techniques described herein may be implemented.

As described in more detail with respect to FIG. 2, controller 14 executes on processing circuitry. The processing circuitry may be distributed processing circuitry across a plurality of servers or may be processing circuitry in a single server. For instance, the servers, such as within VCE 12A, execute virtual machines (VMs) on their respective processing circuitry, and controller 14 may execute on one or more of the VMs. In this way, controller 14 may be considered as executing on one or more processing circuitry.

In some examples, controller 14 executes on a computing device that that is accessible to a network administrator for a particular tenant. However, the cloud (e.g., one or more VCEs 12) may be considered as simply another physical location, although operating in a virtualized environment. Therefore, controller 14 need not necessarily execute on a computing device that a network administrator is accessing, but could be executing in a virtualized environment within any of VCEs 12.

The network administrator may interface with only controller 14 to establish proper, secure communication links for the tenants of the network administrator. For example, rather than requiring that the network administrator interface with a first controller for VCE 12A, a second controller for VCE 12B, and so forth, the network administrator might access controller 14. As described herein, the network administrator may interact with, configure, and/or interface with multiple clusters 11 through only controller 14. In some examples, such an administrator may interact with such clusters via a single pane of glass to establish the communication links between VCEs 12.

Each of connect gateway routers 18 may represent an Amazon Web Services VPC virtual gateway, a Google Cloud Router, or a Tungsten Fabric or Contrail or OpenContrail Gateway, or other software gateway for a virtual computing environment, for example.

Controller 14 (e.g., a single controller 14) may be configured to establish communication links between VCEs 12. In this manner, controller 14 may be configured to establish a full mesh of communication tunnels that interconnect VCEs 12. In the example illustrated in FIG. 1A, connect gateway routers 18A and 18B are connected via tunnel 28A, connect gateway routers 18B and 18C are connected via tunnel 28B, and connect gateway routers 18C and 18A are connected via tunnel 28C. In this manner, tunnels 28A-28C represent a full mesh of communication tunnels for VCEs 12 to communicate with one another. In this way, each one of connect gateway routers 18 is associated with a logical endpoint within a logical tunnel mesh for respective VCEs 12.

Tunnels 28 may be logical tunnels in that tunnels 28 from an overlay over an underlay of physical connections. As one example, tunnels 28 may be formed over the Internet. Therefore, tunnels 28 may represent the manner in which VCEs 12 may be interconnected through the Internet, regardless of the particular underlaying hardware components of the Internet tunnels 28 utilize for communication.

There may be various example ways in which controller 14 may establish tunnels 28. As one example, controller 14 utilizes Internet protocol security (IPSec) sessions or secure sockets layer (SSL) protocol or transport layer security (TLS) protocol between connect gateway routers 18 to establish tunnels 28 so that VCEs 12 can communicate via the Internet. In some examples, controller 14 may utilize IPSec sessions between vrouter 20 and 24, and possibly the vrouter of VCE 12A, for communication via the Internet. As one example, controller 14 establishes IPSec session between vrouter 20, 24 and controller 14 in examples where controller 14 is either in a public or private cloud and vrouters 20, 24 are deployed across geographically distributed environments. In examples where controller 14 establishes tunnels 28 via IPSec sessions, each one of respective connect gateway routers 18 vrouters 20 and 24 may communicate using user datagram (UDP) encapsulated in encapsulating security payload (ESP) packets.

By establishing the logical tunnel mesh, controller 14 may be configured to determine one or more logical tunnels from the logical tunnel mesh to establish one or more communication links between a first VCE and a second VCE. As one example, as part of establishing the logical tunnel mesh, controller 14 may determine that tunnel 28A is a communication link for VCEs 12A and 12B to communicate with one another, tunnel 28B is a communication link for VCEs 12B and 12C to communicate with one another, and tunnel 28C is a communication link for VCEs 12C and 12A to communicate with one another.

Figure 1B:
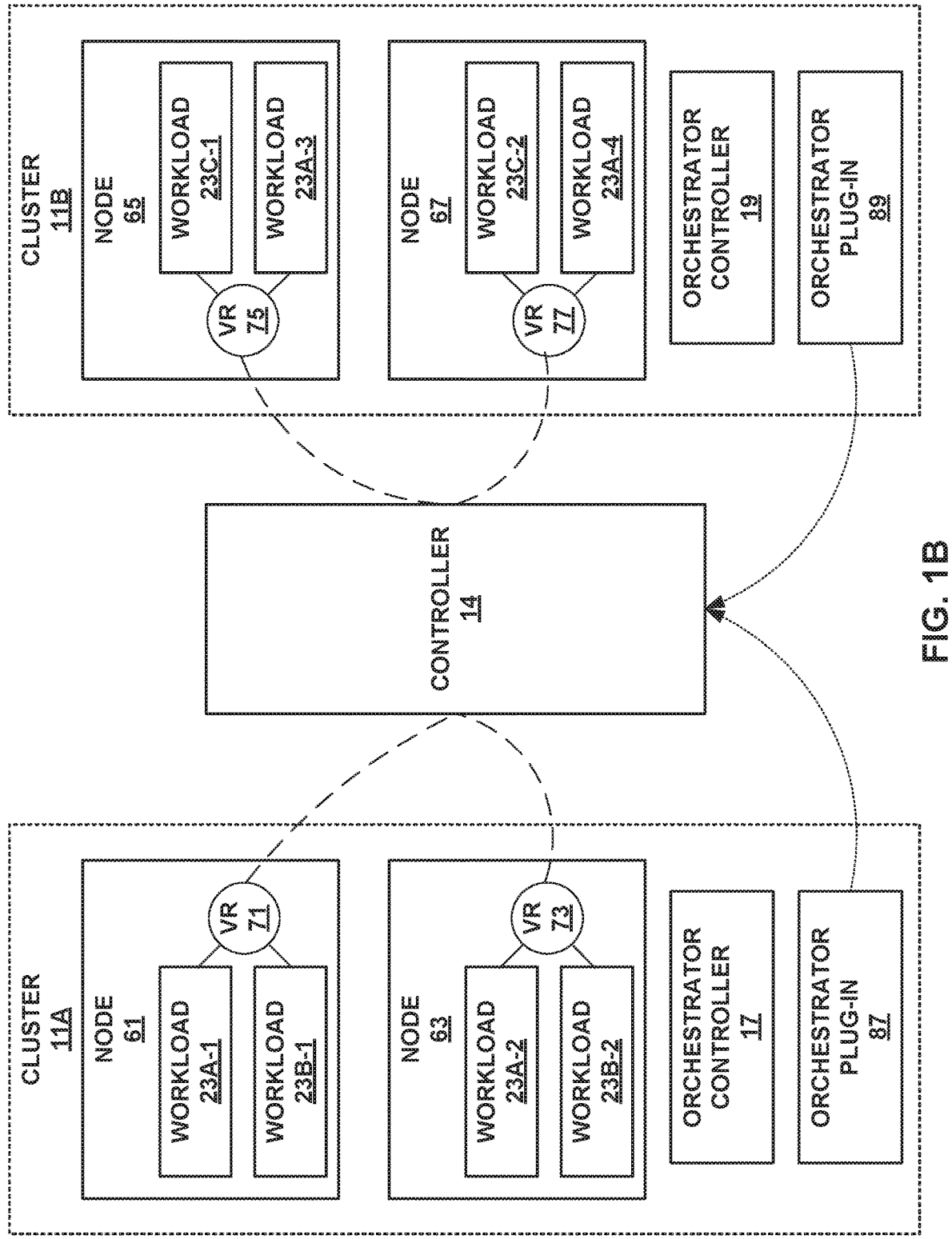
FIG. 1B is a block diagram illustrating example details of a multi-cluster network configured to communicate in accordance with one or more example techniques described in this disclosure.

FIG. 1B is a block diagram illustrating example details of a multi-cluster network configured to communicate in accordance with one or more example techniques described in this disclosure. As shown, cluster 11A may include nodes 61 and 63 and cluster 11B may include nodes 65 and 67. Nodes 61, 63, 65, and 67 may comprise a virtual machine implemented in processing circuitry, a server, or another node. Virtual router 71 may be configured to provide network connectivity to workloads 23A-1 and 23B-1 and virtual router 73 may be configured to provide network connectivity to workloads 23A-2 and 23B-2. Similarly, virtual router 75 may be configured to provide network connectivity to workloads 23C-1 and 23A-3 and virtual router 77 may be configured provide network connectivity to workloads 23C-2 and 23A-4. Virtual routers 71-77 may comprise software applications executing on respective servers within clusters 11.

In the example of FIG. 1B, workloads 23A-1 and 23A-2 may represent workloads for a first project associated with a first project identifier and a first cluster identifier assigned to cluster 11A. Workloads 23A-3 and 23A-4 may represent workloads for a second project associated with the same first project identifier and a second cluster identifier assigned to cluster 11B. In some examples, workloads 23A-1, 23A-2, 23A-3, and 23A-4 may be collectively, referred to herein as "workloads 23A." Workloads 23B-1 and 23B-2 (collectively, referred to herein as "workloads 23B") may represent workloads for a second project associated with a project identifier different from the first project identifier and associated with the first cluster identifier assigned to cluster 11A. Workloads 23C-1 and 23C-2 (collectively, referred to herein as "workloads 23C") may represent workloads for a third project associated with a project identifier different from the first project identifier and associated with the second cluster identifier assigned to cluster 11B.

Orchestrator controller 17 may be configured to manage workloads of cluster 11A. Similarly, orchestrator controller 19 may be configured to manage workloads of cluster 11B. Orchestrator plug-in 87 may be configured to monitor orchestrator controller 17 and output information (e.g., a cluster identifier, a project identifier, configuration information for workloads, etc.) to controller 14. Similarly, orchestrator plug-in 89 may be configured to monitor orchestrator controller 19 and output information (e.g., a cluster identifier, a project identifier, configuration information for workloads, etc.) to controller 14. Orchestrator controllers 17 and 19 and orchestrator plug-ins 17 and 89 and may be implemented in processing circuitry.

In accordance with one or more aspects of the present disclosure, controller 14 may manage or configure one or more aspects of one or more clusters 11. At deployment, the first cluster identifier is assigned to cluster 11A based on an input, for example, from a human user. In this example, orchestrator plug-in 87 may output, to controller 14, the first cluster identifier. Orchestrator controller 17 may establish a first project (e.g., project A that comprise workloads 23A-1 and 23A-2 at cluster 11A). For example, the orchestrator controller 17 may determine a first project identifier for the first project, that is, for example, generated based on an input from a human user accessing orchestrator controller 17. In this example, orchestrator plug-in 87 may output, to controller 14, the first project identifier and the first cluster identifier. Orchestrator controller 17 may establish a first group of workloads 23A-1 and 23A-2 for the first project. For example, orchestrator controller 17 may allocate resources of nodes 61 and 63 of cluster 11A to the first project. In this example, orchestrator plug-in 87 may output, to controller 14, configuration information for the first group of workloads 23A-1 and 23A-2. The configuration information may indicate the first cluster identifier for cluster 11A, a first project identifier for the first project, one or more workload identifiers for the first group of workloads 23A-1 and 23A-2. The configuration information output by orchestrator plug-in 87 may include network configuration information, including, for example, networking interfaces and network policies for the first group of workloads 23A-1 and 23A-2.

Controller 14 may determine whether the first configuration information indicates the first cluster identifier. For example, controller 14 may determine that the first configuration information indicates the first cluster identifier when the configuration information includes a sequence (e.g., an alphanumeric code) that matches the first cluster identifier previously sent to controller 14 by orchestrator plug-in 87. In response to the determination that first configuration information indicates the first cluster identifier, controller 14 may configure the first set of virtual routers 71 and 73 to provide network connectivity for the first group of workloads 23A-1 and 23A-2. While the first set of virtual routers in the example of FIG. 1A includes two virtual routers, a first set of routers may include one or more than three virtual routers. Similarly, while FIG. 1A illustrates cluster 11A as including two nodes that each include a virtual router, clusters may include one or more than three nodes. Controller 14 may add routes to a routing table to virtual routers 71 and 73 for connecting the first group of workloads 23A-1 and 23A-2. Controller 14 may refrain from configuring a second set of virtual routers of other clusters (e.g., virtual routers 75 and 77 of cluster 11B) in response to a determination that the first configuration information does not indicate a second cluster identifier for cluster 11B.

Controller 14 may determine whether the first configuration information indicates the first project identifier. For example, controller 14 may determine the first group of workloads 23A-1 and 23A-2 is assigned to the first project identifier. In this example, controller 14 may configure the first set of virtual routers 71 and 73 at cluster 11A to provide connectivity to the first group of workloads 23A-1 and 23A-2 using the first configuration information further in response to the determination that the first configuration information indicates the first project identifier.

At deployment, a second cluster identifier is assigned to cluster 11B based on an input, for example, from a human user. Cluster 11B may be established independently from cluster 11A. Orchestrator plug-in 89 may output, to controller 14, the second cluster identifier. Orchestrator controller 19 may establish the first project at cluster 11B. For example, orchestrator controller 19 may determine a first project identifier for the first project, that is, for example, generated based on an input from a human user accessing orchestrator controller 19. In this example, orchestrator plug-in 89 may output, to controller 14, the first project identifier and the second cluster identifier. Orchestrator controller 19 may establish a second group of workloads 23A-3 and 23A-4. For example, orchestrator controller 19 may allocate resources of nodes 65 and 67 of cluster 11B to the first project. In this example, orchestrator plug-in 89 may output, to controller 14, second configuration information for the second group of workloads 23A-3 and 23A-4. In this example, controller 14 may configure a second set of virtual routers 75 and 77 to provide connectivity to workloads 23A-3 and 23A-4. While the second set of virtual routers in the example of FIG. 1A includes two virtual routers, a second set of routers may include one or more than three virtual routers. Similarly, while FIG. 1A illustrates cluster 11B as including two nodes that each include a virtual router, clusters may include one or more than three nodes. Controller 14 may add routes to a routing table to the second set of virtual routers 75 and 77. Controller 14 may refrain from configuring the first set of virtual routers (e.g., virtual routers 71 and 73 of cluster 11A) in response to a determination that the second configuration information does not indicate the first cluster identifier for cluster 11A.

In some examples, the first project identifier for the first group of workloads 23A-1 and 23A-2 corresponds (e.g., matches) the first project identifier for the second group of workloads 23A-3 and 23A-4. Controller 14 may determine whether the second configuration information indicates the first project identifier for cluster 11B. For example, controller 14 may determine the second group of workloads 23A-3 and 23A-4 is assigned to the first project identifier and the first cluster identifier for cluster 11A. In this example, controller 14 may configure second set of virtual routers 75 and 77 at cluster 11B to provide connectivity to second group of workloads 23A-3 and 23A-4 using the second configuration information further in response to the determination that the second configuration information indicates the first project identifier and the second cluster identifier for cluster 11B.

In the example of FIG. 1B, clusters 11 may have different project identifiers. For example, orchestrator controller 17 may establish a group of workloads 23B-1 and 23B-2 for a project B assigned a project identifier that is different from the first group of workloads 23A-1 and 23A-2 and the second group of workloads 23A-3 and 23A-4. Orchestrator controller 19 may establish a group of workloads 23C-1 and 23C-2 for a project C assigned a project identifier that is different from the first group of workloads 23A-1 and 23A-2, the second group of workloads 23A-3 and 23A-4, and the group of workloads 23A-3 and 23A-4.

More specifically, for example, orchestrator controller 19 may establish a second project at cluster 11B using a second project identifier that is different from the first project identifier. For example, orchestrator controller 19 may determine the second project identifier for a second project, that is, for example, generated based on an input from a human user accessing orchestrator controller 19. In this example, orchestrator plug-in 89 may output, to controller 14, the second project identifier and the second cluster identifier. Orchestrator controller 19 may establish a second group of workloads 23C-1 and 23C-2. In this example, orchestrator plug-in 89 may output, to controller 14, the second configuration information for the second group of workloads 23C-1 and 23C-2. In this example, controller 14 may configure the second set of virtual routers 75 and 77 to provide connectivity to workloads 23C-1 and 23C-2. For example, controller 14 may add routes to a routing table to the second set of virtual routers 75 and 77. Controller 14 may refrain from configuring the first set of virtual routers (e.g., virtual routers 71 and 73 of cluster 11A) in response to a determination that the second configuration information does not indicate the first cluster identifier for cluster 11A.

Controller 14 may determine whether the second configuration information indicates the second project identifier. For example, controller 14 may determine the second group of workloads 23C-1 and 23C-2 is assigned to the second project identifier. In this example, controller 14 may configure the second set of virtual routers 75 and 77 at cluster 11B to connect the second group of workloads 23C-1 and 23C-2 to network 100 using the second configuration information further in response to the determination that the second configuration information indicates the first project identifier. Controller 14 may refrain from configuring the second set of virtual routers (e.g., virtual routers 75 and 77 of cluster 11B) to connect the second group of workloads 23A-3 and 23A-4 to network 100 in response to a determination that the second configuration information does not indicate the first project identifier.

Through techniques in accordance with one or more aspects of the present disclosure, such as by implementing controller 14 for configuring clusters 11, network 100 may enable configuration of multiple clusters 11 through a single controller, and using a single set of authentication credentials. Such an implementation may result in a more efficient way of configuring multiple clusters 11 because administering multiple clusters 11 may be performed without accessing multiple systems independently.

Further, by dynamically maintaining information about multiple clusters in a data store included within controller 14, controller 14 may efficiently identify, for a given configuration request received from administrators, which of workloads 23 across multiple clusters 11 are being managed. By identifying the appropriate workloads 23 associated with a given configuration request, controller 14 may efficiently route the configuration request to the appropriate cluster 11 and the appropriate workload 23 within that cluster. Further, by caching information about workloads 23, controller 14 may perform techniques described herein while introducing little or no latency.

FIG. 2 is a block diagram illustrating an example multi-cloud network having a data center in which examples of the techniques described herein may be implemented. FIG. 2 illustrates data centers 32A-32X, which house servers that form respective VCEs 12. In one example, data center 32A houses servers 34A-34N that may be configured to provide the infrastructure for VCE 12A. The other data centers 32 may be substantially similar to data center 32A, but may house servers for other VCEs 12. Also, one of data centers 32 may house servers for multiple VCEs 12.

As illustrated in FIG. 2, data centers 32A-32X (collectively, "data centers 32") are interconnected with one another and with clusters 11 via a service provider network 33. In general, each data center 32 provides an operating environment for applications and services for clusters 11 coupled to the data center by service provider network 33. Data centers 32 may, for example, host infrastructure equipment, such as networking and storage systems, redundant power supplies, and environmental controls. Service provider network 33 may be coupled to one or more networks administered by other providers, and may thus form part of a large-scale public network infrastructure, e.g., the Internet.

In some examples, each data centers 32 may represent one of many geographically distributed network data centers. As illustrated in the example of FIG. 2, each of data centers 32 may represent a facility that provides network services for clusters 11. Clusters 11 may support customers that include collective categories such as enterprises and governments or individuals. For example, a network data center may host a virtual computing environment (e.g., cloud) that provides web services for several enterprises and end users. Other exemplary services may include data storage, virtual private networks, traffic engineering, file service, data mining, scientific- or super-computing, and so on. In some examples, each of data centers 32 may be individual network servers, network peers, or otherwise.

In the illustrated example, each of data centers 32 includes a set of storage systems and application servers 34A-34N (herein, "servers 34") interconnected via high-speed switch fabric 35 provided by one or more tiers of physical network switches and routers. Switch fabric 35 is provided by a set of interconnected top-of-rack (TOR) switches 40A-40N (collectively, "TOR switches 40") coupled to a distribution layer of chassis switches 42A-42Y (collectively, "chassis switches 42"). Although not shown, each of data centers 32 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 40 and chassis switches 42 provide servers 34 with redundant (multi-homed) connectivity to IP fabric 44 and service provider network 33. Chassis switches 42 aggregate traffic flows and provides high-speed connectivity between TOR switches 40. TOR switches 40 may be network devices that provide layer two (e.g., MAC) and/or layer 3 (e.g., IP) routing and/or switching functionality. TOR switches 40 and chassis switches 42 may each include one or more processors and a memory, and that are capable of executing one or more software processes. Chassis switches 42 are coupled to IP fabric 44, which performs layer 3 routing to route network traffic between data centers 32 and customers 46 by service provider network 33.

In the example illustrated in FIG. 2, data center 32A is configured to provide the infrastructure for VCE 12A. For example, servers 34A-34N may be configured to execute virtualized compute instances (e.g., containers or virtual machines (VMs)) to support the operation of VCE 12A. Moreover, in the example of FIG. 1A, controller 14 is part of VCE 12A. Accordingly, servers 34A-34N may be configured to support the operation of controller 14.

As illustrated in FIG. 2, servers 34A and 34B execute VMs 50A and 50B. In this example, VMs 50A and 50B together provide a virtualized machine on which controller 14 can execute and perform the example operations of controller 14 described in this disclosure (e.g., provide a centralized controller to ensure proper route propagation, securing, and application deployment for multiple clusters implemented on the VCEs with a single pane of glass interface). Servers 34A, 34B, and 34N execute VMs 54A, 54B, and 54C. In this example, VMs 54A, 54B, and 54C together provide a virtualized machine on which connect gateway router 18A executes and performs the example operations of connect gateway router 18A described in this disclosure (e.g., form a logical endpoint within a logical tunnel mesh for VCE 12A).

Server 34N is also illustrated as executing VM 52. VM 52 may provide a virtualized machine on which applications that are to execute within VCE 12A execute. For example, VCE 12A may provide computation resources to offload computationally complex tasks from a personal computer. In some examples, VM 52 is the platform on which the applications execute to perform the tasks offloaded from the personal computer.

VMs 50A, 50B, 52, 54A, 54B, and 54C are illustrated merely to assist with understanding and should not be considered as limiting. Instead, services may implement a container. For example, server 34 may implement clusters 11 using a container orchestration system. For example, virtualized network controller 36 may be configured to spin up and spin down containers and/or virtual machines across or within servers 34 as needed to support the operations of controller 14, connect gateway router 18A, and VCE 12A.

However, the example techniques are not so limited, and in some examples, controller 14 may be configured to determine resources within data center 32A that are to be utilized (e.g., how many VMs are spun up or spun down) for VCE 12A. Moreover, in some examples, controller 14 may be configured to determine resources within the other data centers 32 that are to be utilized (e.g., how many VMs are spun up or spun down) for the other VCEs 12. VMs 50A, 50B, 52, 54A, 54B, and 54C may execute on processing circuitry of respective servers 34A, 34B, and 34N.

Virtual network controller 36 ("VNC") may provide a logically and in some cases physically centralized controller for facilitating operation of one or more virtual networks within each of data centers 32, such as data center 32A. In some examples, virtual network controller 36 may operate in response to configuration input received from network administrator 38. Moreover, as illustrated, in this example, administrator 38 may be tasked with providing configuration information for controller 14 so that controller 14 can perform the example operations described in this disclosure. Administrator 38 may represent an operator, developer, or application deployment specialist that uses a common interface to create and deploy virtual computing environment topologies to virtualized network controller 36 and controller 14 for provisioning within the computing infrastructure. Additional information regarding virtual network controller 36 operating in conjunction with other devices of data center 32A or other software-defined network is found in International Application Number PCT/US2013/044378, filed Jun. 5, 2013, and entitled "PHYSICAL PATH DETERMINATION FOR VIRTUAL NETWORK PACKET FLOWS" and in U.S. patent application Ser. No. 14/226,509, filed Mar. 26, 2014, and entitled "Tunneled Packet Aggregation for Virtual Networks," each which is incorporated by reference as if fully set forth herein.

In some examples, the traffic between any two network devices, such as between network devices within IP fabric 44 (not shown), between servers 34, and customers 46, or between servers 34, for example, can traverse the physical network using many different paths. A packet flow (or "flow") can be defined by the five values used in a header of a packet, or "five-tuple," i.e., the protocol, source IP address, destination IP address, source port and destination port that are used to route packets through the physical network. For example, the protocol specifies the communications protocol, such as TCP or UDP, and source port and destination port refer to source and destination ports of the connection.

The flow within data center 32A is one example of a flow. Another example of a flow is the flow of data between VCEs 12. As described above, examples of flow between VCEs 12 include UDP encapsulated ESP packets.

A set of one or more packet data units (PDUs) that include a packet header specifying a particular five-tuple represent a flow. Flows may be broadly classified using any parameter of a PDU, such as source and destination data link (e.g., MAC) and network (e.g., IP) addresses, a Virtual Local Area Network (VLAN) tag, transport layer information, a Multi-protocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port. A flow may be additionally or alternatively defined by an Application Identifier (AppID) that is determined by a virtual router agent or other entity that identifies, e.g., using a port and protocol list or deep packet inspection (DPI), a type of service or application associated with the flow in that the flow transports application data for the type of service or application.

Accordingly, FIG. 2 illustrates an example of a VCE 12A of FIG. 1A in a multi-cluster network 100. For example, in FIG. 2, a single SDN controller represented by controller 14 may be configured to manage or configure one or more aspects of one or more clusters 11. Controller 14 may store an indication of a first cluster identifier for cluster 11A. Similarly, controller 14 may store an indication of a second cluster identifier for cluster 11N. Orchestrator plug-ins 13A through 13N (referred to herein as "orchestrator plug-ins 13") may be configured to translate objects for controller 14. For example, orchestrator plug-in 13A may be configured to translate objects for cluster 11A into objects for controller 14A using the first cluster identifier. For instance, orchestrator plug-in 13A may append the first cluster identifier to requests for configuration changes.

Controller 14 may logically partition objects for clusters 11. For example, controller 14 may logically partition objects received that indicate the first cluster identifier and a first project identifier into a first group of objects and logically partition objects received that indicate the second cluster identifier and a second project identifier into a second group of objects. In this example, controller 14 may allow access of the first group to only one or more administrators of cluster 11A. Similarly, controller 14 may allow access of the second group to only one or more administrators of cluster 11N. In some examples, controller 14 may logically partition objects for the project from other projects of a single cluster. For example, controller 14 may logically partition objects received that indicate the first cluster identifier and a first project identifier into a first group of objects and logically partition objects received that indicate the first cluster identifier and a second project identifier into a second group of objects. In this way, controller 14 may separately manage each respective project implemented using clusters 11.

Controller 14 may serve as a software defined network management and orchestration system for one or more containers 55A, one or more containers 55B, and one or more containers 55C (collectively referred to herein as containers 55). In some examples, controller 14 may represent a container orchestration system for implementing containers 55. Containers 554 may execute within an operating environment provided by servers 34A. In some examples, controller 14 may perform various organizational and maintenance tasks, including organizing one or more containers 55 into logical groups of related containers. In accordance with the techniques of the disclosure, controller 14 may logically organize containers to logically partition the containers based on a cluster.

Containers 55 may each represent a stand-alone, executable package of computing instructions. In some examples, each of containers 55 include code, runtime objects, system tools, system libraries, and/or settings needed to properly execute. In some examples, some components (e.g., runtime objects, libraries) may be provided by a container engine and/or an operating system. Further, in some examples, each of containers 55 may be isolated from other containers 55. Like a virtual machine, each of containers 55 may be virtualized and may remain isolated from the servers 34A and other containers. However, unlike a virtual machine, each container of containers 55 may omit an individual operating system and provide only an application suite and application-specific libraries. Each of containers 55 may be executed by servers 34 as an isolated user-space instance and may share an operating system and common libraries with other containers. As used herein, containers 55 may also be referred to as virtualization engines, virtual private servers, silos, or jails. In some examples, the techniques described herein with respect to containers may be applied to virtual machines or other virtualization components. In some examples, containers 55 may be managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems.

Through techniques in accordance with one or more aspects of the present disclosure, such as by implementing controller 14 for configuring clusters 11, network 100 may enable configuration of multiple clusters 11 through a single controller, and using a single set of authentication credentials. Such an implementation may result in a more efficient way of configuring multiple clusters 11 because administering multiple clusters 11 may be performed without accessing multiple systems independently. Moreover, implementing controller 14 for configuring clusters 11 may enable each cluster of clusters 11 to take advantage of networking infrastructure provided by controller 14 to multiple clusters 11, without requiring clusters 11 to each implement networking individually (e.g., by using their own SDN controller). As such, controller 14 may be configured to manage multiple clusters, and to enable each cluster to self-administer, while also retaining isolation between clusters.

Further, by dynamically maintaining information about multiple clusters in a data store included within controller 14, controller 14 may efficiently identify, for a given configuration request received from administrators a workload across multiple clusters 11. By identifying the appropriate workload associated with a given configuration request, controller 14 may efficiently route the configuration request to the appropriate cluster 11 and the virtual router within that cluster. Further, by caching information about clusters, controller 14 may perform techniques described herein while introducing little or no latency.

Although FIG. 2 illustrates one example of data center 32A, other data centers may be substantially similar, but may not execute an instance of controller 14. For example, a set of one or more virtual machines executing on second set of one or more servers in data center 32A form an infrastructure for VCE 12B. Also, at least one of the set of one or more virtual machines executes connect gateway router 18B to form the logical endpoint for VCE 12B. In this example, controller 14 is configured to establish a logical tunnel (e.g., tunnel 28A) of the logical tunnel mesh that interconnects the connect gateway router 18A and connect gateway router 18B.

Figure 3:
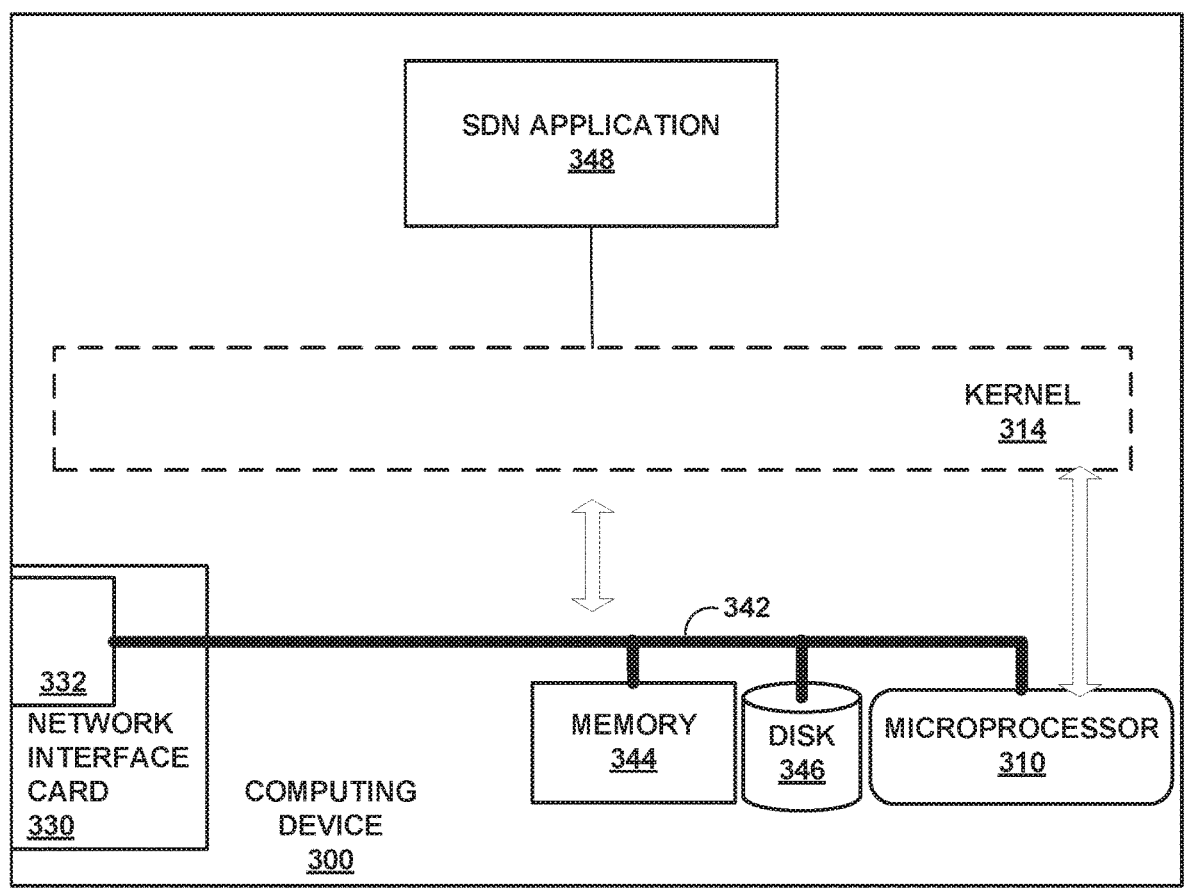
FIG. 3 is a block diagram of an example computing device, according to techniques described in this disclosure.

FIG. 3 is a block diagram of an example computing device, according to techniques described in this disclosure. Computing device 300 may be an example instance of servers 34 of FIG. 2 for a cloud computing infrastructure. Computing device 300 may represent one or more real or virtual servers configured to perform operations for SDN controller 14. Although one example of computing device 300 is illustrated, it should be understood that SDN controller 14 may be a logically centralized, but physically distributed controller. Hence, SDN controller 14 may execute across one or more computing devices, and computing device 300 is one example of such computing devices.

Computing device 300 includes in this example, a bus 342 coupling hardware components of a computing device 300 hardware environment. Bus 342 couples network interface card (NIC) 330, storage disk 346, and one or more microprocessors 310 (hereinafter, "microprocessor 310"). A front-side bus may in some cases couple microprocessor 310 and memory device 344. In some examples, bus 342 may couple memory device 344, microprocessor 310, and NIC 330. Bus 342 may represent a Peripheral Component Interface (PCI) express (PCIe) bus. In some examples, a direct memory access (DMA) controller may control DMA transfers among components coupled to bus 342. In some examples, components coupled to bus 342 control DMA transfers among components coupled to bus 342.

Microprocessor 310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor). For instance, microprocessor 310 is an example of processing circuitry on which SDN controller 14 executes.

Disk 346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 310.

Main memory 344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 344 provides a physical address space composed of addressable memory locations.

Network interface card (NIC) 330 includes one or more interfaces 332 configured to exchange packets using links of an underlying physical network. Interfaces 332 may include a port interface card having one or more network ports. NIC 330 may also include an on-card memory to, e.g., store packet data. Direct memory access transfers between the NIC 330 and other devices coupled to bus 342 may read/write from/to the NIC memory.

Memory 344, NIC 330, storage disk 346, and microprocessor 310 may provide an operating environment for a software stack that includes an operating system kernel 314 executing in kernel space. Kernel 314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 314 provides an execution environment for one or more processes in a user space.

Computing device 300 may be coupled to a physical network switch fabric that includes an overlay network that extends switch fabric from physical switches to software or "virtual" routers of physical servers coupled to the switch fabric, such as virtual router 48 of FIG. 2. Computing device 300 provides an operating environment for SDN controller application 348, which may perform operations described above with respect to other instances of SDN controllers described herein. SDN controller application 348 represents one or more applications, and SDN controller application 348 may execute one or more protocols, such as Simple Network Management Protocol (SNMP) and Netconf. SDN application 348 may use the one or more protocols to, e.g., establish tunnels 18 and BGP peering sessions over tunnels between connect gateway routers.

Figure 4:
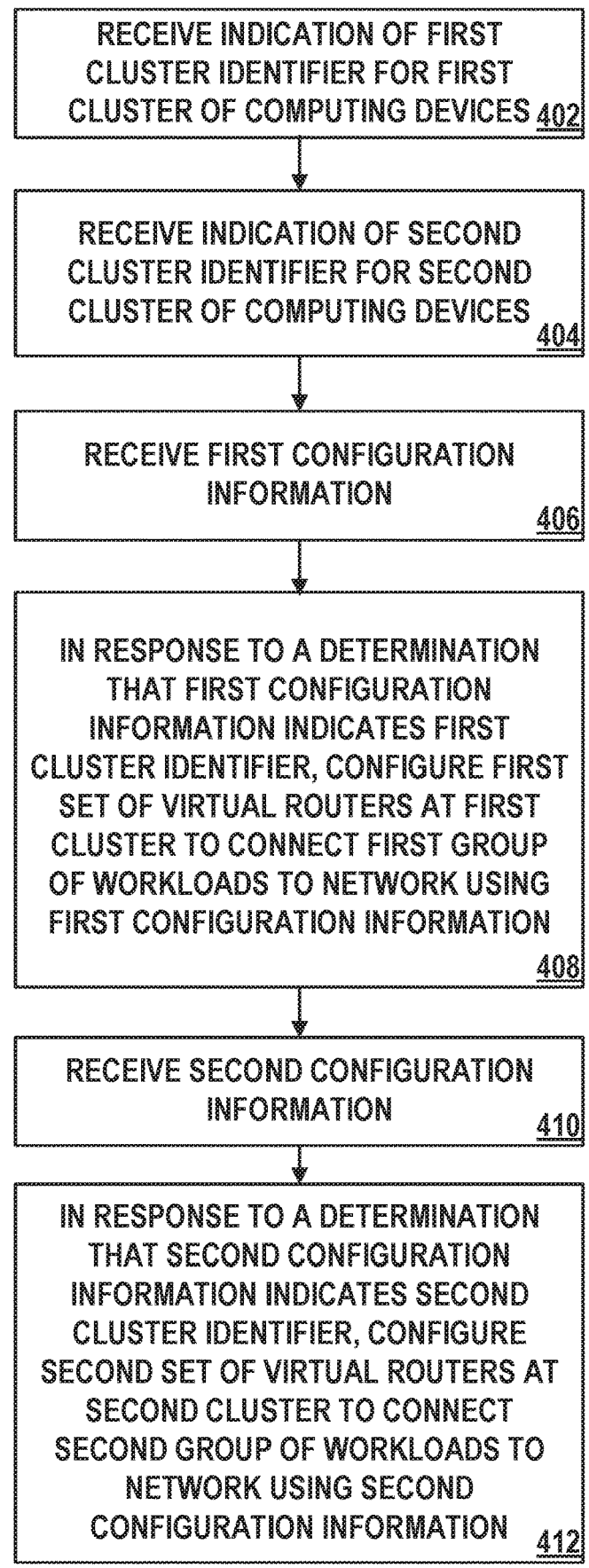
FIG. 4 is a flow diagram illustrating an example process for performing workload configuration or management tasks in accordance with one or more aspects of the present disclosure

FIG. 4 is a flow diagram illustrating an example process for performing endpoint configuration or management tasks in accordance with one or more aspects of the present disclosure. In the example of FIG. 4, the illustrated process may be performed by network 100, and more specifically, controller 14 in the context illustrated in FIG. 1.

In the process illustrated in FIG. 4, and in accordance with one or more aspects of the present disclosure, controller 14 may receive an indication of a first cluster identifier for a first cluster of computing devices (402). The first cluster may be implemented using a first orchestrator controller of a container orchestration system and the first orchestrator controller may be configured to establish a first group of workloads for the first cluster.

Controller 14 may receive an indication of a second cluster identifier for a second cluster of computing devices (404). The second cluster may be implemented using a second orchestrator controller of the container orchestration system that is different from the first orchestrator controller and the second orchestrator controller may be configured to establish a second group of workloads for the second cluster. Controller 14 may receive first configuration information (406).

In response to a determination that first configuration information indicates the first cluster identifier, controller 14 may configure a first set of virtual routers at the first cluster to connect the first group of workloads to a network using the first configuration information (408). Controller 14 may receive second configuration information (410). In response to a determination that second configuration information indicates the second cluster identifier, controller 14 may configure a second set of virtual routers at the second cluster to connect the second group of workloads to a network using the second configuration information (412).

In some examples, controller 14 may receive a project identifier identifying at a project of the first cluster. Controller 14 may configure the first set of virtual routers based on the project identifier of. For example, controller 14 may determine whether first configuration information indicates the project identifier and determine the first group of workloads is assigned to the project identifier and configure the first set of virtual routers at the first cluster to connect the first group of workloads to a network using the first configuration information further in response to the determination that the first configuration information indicates the project identifier. Controller 14 may be configured to determine whether second configuration information indicates the project identifier and determine the second group of workloads is assigned to the project identifier and to configure the second set of virtual routers at the second cluster to connect the second group of workloads to the network using the second configuration information further in response to the determination that the second configuration information indicates the project identifier.

In some examples, controller 14 may be configured to determine whether second configuration information indicates a second project identifier and determine the second group of workloads is assigned to the second project identifier, wherein the SDN controller is configured to configure the second set of virtual routers at the second cluster to connect the second group of workloads to the network using the second configuration information further in response to the determination that the second configuration information indicates the second project identifier.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A system comprising a single software-defined networking (SDN) controller, executing on processing circuitry, configured to:
   receive an indication of a first cluster identifier for a first cluster of computing devices, wherein the first cluster is implemented using a first orchestrator controller of a container orchestration system, the first orchestrator controller configured to establish a first group of workloads for the first cluster;
   receive an indication of a second cluster identifier for a second cluster of computing devices, wherein the second cluster is implemented using a second orchestrator controller of the container orchestration system that is different from the first orchestrator controller, the second orchestrator controller configured to establish a second group of workloads for the second cluster;
   in response to a determination that first configuration information indicates the first cluster identifier, configure a first set of virtual routers at the first cluster to connect the first group of workloads to a network using the first configuration information;
   in response to a determination that the first configuration information does not indicate the second cluster identifier, refrain from configuring a second set of virtual routers at the second cluster to connect the second group of workloads to the network using the first configuration information;

in response to a determination that second configuration information indicates the second cluster identifier, configure the second set of virtual routers at the second cluster to connect the second group of workloads to the network using the second configuration information; and in response to a determination that the second configuration information does not indicate the first cluster identifier, refrain from configuring the first set of virtual routers at the first cluster to connect the first group of workloads to the network using the second configuration information.

2. The system of claim 1, wherein the SDN controller is configured to:

determine whether the first configuration information indicates a project identifier; and determine the first group of workloads is assigned to the project identifier, wherein the SDN controller is configured to configure the first set of virtual routers at the first cluster to connect the first group of workloads to the network using the first configuration information further in response to the determination that the first configuration information indicates the project identifier.

3. The system of claim 2, wherein the SDN controller is configured to:

determine whether the second configuration information indicates the project identifier; and determine the second group of workloads is assigned to the project identifier, wherein the SDN controller is configured to configure the second set of virtual routers at the second cluster to connect the second group of workloads to the network using the second configuration information further in response to the determination that the second configuration information indicates the project identifier.

4. The system of claim 2, wherein the project identifier is a first project identifier and wherein the SDN controller is configured to:

determine whether the second configuration information indicates a second project identifier; and determine the second group of workloads is assigned to the second project identifier, wherein the SDN controller is configured to configure the second set of virtual routers at the second cluster to connect the second group of workloads to the network using the second configuration information further in response to the determination that the second configuration information indicates the second project identifier.

5. The system of claim 1, wherein the SDN controller is associated with a software application template;

wherein the first cluster is associated with a first software application generated using the software application template; and wherein the second cluster is associated with a second software application generated using the software application template.

6. The system of claim 1, wherein the first cluster comprises a first edge device; and wherein the second cluster comprises a second edge device different from the first edge device.

7. A method comprising:

receiving an indication of a first cluster identifier for a first cluster of computing devices, wherein the first cluster is implemented using a first orchestrator controller of a container orchestration system, the first orchestrator controller configured to establish a first group of workloads for the first cluster;

receiving an indication of a second cluster identifier for a second cluster of computing devices, wherein the second cluster is implemented using a second orchestrator controller of the container orchestration system that is different from the first orchestrator controller, the second orchestrator controller configured to establish a second group of workloads for the second cluster;

in response to determining that first configuration information indicates the first cluster identifier, configuring a first set of virtual routers at the first cluster to connect the first group of workloads to a network using the first configuration information;

in response to determining that the first configuration information does not indicate the second cluster identifier, refraining from configuring a second set of virtual routers at the second cluster to connect the second group of workloads to the network using the first configuration information;

in response to determining that second configuration information indicates the second cluster identifier, configuring the second set of virtual routers at the second cluster to connect the second group of workloads to the network using the second configuration information; and in response to determining that the second configuration information does not indicate the first cluster identifier, refraining from configuring the first set of virtual routers at the first cluster to connect the first group of workloads to the network using the second configuration information.

8. The method of claim 7, comprising:

determining whether the first configuration information indicates a project identifier; and determining the first group of workloads is assigned to the project identifier, wherein configuring the first set of virtual routers at the first cluster to connect the first group of workloads to the network using the first configuration information is further in response to determining that the first configuration information indicates the project identifier.

9. The method of claim 8, comprising:

determining whether the second configuration information indicates the project identifier; and determining the second group of workloads is assigned to the project identifier, wherein configuring the second set of virtual routers at the second cluster to connect the second group of workloads to the network using the second configuration information is further in response to determining that the second configuration information indicates the project identifier.

10. The method of claim 8, wherein the project identifier is a first project identifier, the method further comprising:

determining whether the second configuration information indicates a second project identifier; and determining the second group of workloads is assigned to the second project identifier, wherein configuring the second set of virtual routers at the second cluster to connect the second group of workloads to the network using the second configuration information is further in response to determining that the second configuration information indicates the second project identifier.

11. The method of claim 7,
wherein the first cluster is associated with a first software application generated using a software application template; and
wherein the second cluster is associated with a second software application generated using the software application template.

12. The method of claim 7,
wherein the first cluster comprises a first edge device; and
wherein the second cluster comprises a second edge device different from the first edge device.

13. A non-transitory computer-readable storage medium storing instructions thereon that when executed cause one or more processors, via execution of a single software-defined networking (SDN) controller, to:
receive an indication of a first cluster identifier for a first cluster of computing devices, wherein the first cluster is implemented using a first orchestrator controller of a container orchestration system, the first orchestrator controller configured to establish a first group of workloads for the first cluster;
receive an indication of a second cluster identifier for a second cluster of computing devices, wherein the second cluster is implemented using a second orchestrator controller of the container orchestration system that is different from the first orchestrator controller, the second orchestrator controller configured to establish a second group of workloads for the second cluster;
in response to a determination that first configuration information indicates the first cluster identifier, configure a first set of virtual routers at the first cluster to connect the first group of workloads to a network using the first configuration information;
in response to a determination that the first configuration information does not indicate the second cluster identifier, refrain from configuring a second set of virtual routers at the second cluster to connect the second group of workloads to the network using the first configuration information;
in response to a determination that second configuration information indicates the second cluster identifier, configure the second set of virtual routers at the second cluster to connect the second group of workloads to the network using the second configuration information; and
in response to a determination that the second configuration information does not indicate the first cluster identifier, refrain from configuring the first set of virtual routers at the first cluster to connect the first group of workloads to the network using the second configuration information.

14. The non-transitory computer-readable storage medium of claim 13, wherein the instructions further cause the one or more processors to:
determine whether the first configuration information indicates a project identifier; and
determine the first group of workloads is assigned to the project identifier, wherein the instructions further cause the one or more processors to configure the first set of virtual routers at the first cluster to connect the first group of workloads to the network using the first configuration information further in response to the determination that the first configuration information indicates the project identifier.

15. The non-transitory computer-readable storage medium of claim 14, wherein the instructions further cause the one or more processors to:
determine whether the second configuration information indicates the project identifier; and
determine the second group of workloads is assigned to the project identifier, wherein the instructions further cause the one or more processors to configure the second set of virtual routers at the second cluster to connect the second group of workloads to the network using the second configuration information further in response to the determination that the second configuration information indicates the project identifier.

16. The non-transitory computer-readable storage medium of claim 14, wherein the project identifier is a first project identifier and wherein the instructions further cause the one or more processors to:
determine whether the second configuration information indicates a second project identifier; and
determine the second group of workloads is assigned to the second project identifier, wherein the instructions further cause the one or more processors to configure the second set of virtual routers at the second cluster to connect the second group of workloads to the network using the second configuration information further in response to the determination that the second configuration information indicates the second project identifier.

17. The non-transitory computer-readable storage medium of claim 13,
wherein the first cluster is associated with a first software application generated using a software application template; and
wherein the second cluster is associated with a second software application generated using the software application template.

* * * * *